(12) United States Patent
Sone et al.

(10) Patent No.: US 10,343,628 B2
(45) Date of Patent: Jul. 9, 2019

(54) WIRING UNIT

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventors: Kosuke Sone, Mie (JP); Hiroki Hirai, Mie (JP); Makoto Higashikozono, Mie (JP); Mitsuhiro Shimamura, Mie (JP); Tadashi Goto, Mie (JP); Kana Hashimoto, Mie (JP)

(73) Assignees: AUTONETWORKS TECHNOLOGIES, LTD., Yokkaichi (JP); SUMITOMO WIRING SYSTEMS, LTD., Yokkaichi, Mie (JP); SUMITOMO ELECTRIC INDUSTRIES, LTD., Osaka-Shi, Osaka (JP)

( * ) Notice: Subject to any disclaimer, the term of this patent is extended or adjusted under 35 U.S.C. 154(b) by 0 days.

(21) Appl. No.: 15/991,002

(22) Filed: May 29, 2018

(65) Prior Publication Data

US 2018/0361958 A1    Dec. 20, 2018

(30) Foreign Application Priority Data

Jun. 14, 2017   (JP) .................. 2017-117087

(51) Int. Cl.
*B60R 16/023* (2006.01)
*B60R 16/02* (2006.01)
*B60R 11/00* (2006.01)
*H02G 3/04* (2006.01)

(52) U.S. Cl.
CPC .......... *B60R 16/0215* (2013.01); *B60R 11/00* (2013.01); *B60R 16/023* (2013.01); *B60R 16/0207* (2013.01); *B60R 2011/0049* (2013.01); *H02G 3/045* (2013.01); *H02G 3/0481* (2013.01)

(58) Field of Classification Search
CPC ....... B60R 16/23; B60R 16/215; B60R 11/00; B60R 11/49
USPC ....... 174/72 A; 210/209, 252, 348, 472, 765
See application file for complete search history.

(56) References Cited

U.S. PATENT DOCUMENTS

| | | | | |
|---|---|---|---|---|
| 6,379,564 B1 * | 4/2002 | Rohrbach | ............ | B01D 37/025 210/209 |
| 8,557,009 B2 * | 10/2013 | Gerlach | ............ | B01D 39/2082 29/611 |
| 2012/0285459 A1 * | 11/2012 | Sata | ........................ | A61L 9/205 128/205.12 |
| 2013/0112612 A1 * | 5/2013 | Blankenstein | .... | B01L 3/502723 210/472 |
| 2016/0031390 A1 | 2/2016 | Kawashima et al. | | |
| 2016/0174412 A1 * | 6/2016 | Karaaslan | .......... | H05K 7/20563 361/692 |

* cited by examiner

*Primary Examiner* — Xiaoliang Chen
(74) *Attorney, Agent, or Firm* — Reising Ethington, P.C.

(57) ABSTRACT

A wiring unit that can reduce the number of oil bubbles. A wiring unit includes: a wire harness; and a wiring board on which the wire harness is arranged, wherein the wiring board has a through hole that penetrates the wiring board, and a filter that is provided in the through hole, and has pores formed in its framework having a polygonal cross section.

3 Claims, 6 Drawing Sheets

WIRING UNIT

CROSS REFERENCE TO RELATED APPLICATIONS

This application claims the priority of Japanese patent application JP2017-117087 filed on Jun. 14, 2017, the entire contents of which are incorporated herein.

TECHNICAL FIELD

The technique disclosed in the present description relates to a wiring unit that is used in circumstances in which oil falls thereon.

BACKGROUND ART

Conventionally, in automatic transmissions of vehicles, a wire harness connected to equipment for controlling or executing a transmission operation is arranged. The wire harness is made by bundling together a plurality of electric wires using a binding member or the like. The wire harness described in JP 2014-199069A is known as such a wire harness.

JP 2014-199069A is an example of related art.

SUMMARY

Oil such as ATF (Automatic Transmission Fluid) flows through the interior of the automatic transmissions. The oil may fall onto the wire harness from above depending on the layout of the wire harness in the automatic transmission. As described above, since wire harnesses are made of a bundle of a plurality of electric wires, the surface of the wire harness is complexly irregular due to the outer peripheral surfaces of the plurality of electric wires. Therefore, the oil that has fallen onto the wire harness is scattered into droplets due to the complex irregularity of the surface of the wire harness. The droplets may be combined into oil drops, and the oil drops may incorporate air while falling into oil accumulated in the lower portion of the automatic transmission, so that oil bubbles are created.

Oil bubbles are air covered with oil films, and thus once oil bubbles are created, there is the problem that control of the oil pressure is difficult. This is because the pressure applied to oil is reduced as a result of the air inside the oil bubbles deflating.

The technique disclosed in the present description was made in view of the circumstances as described above, and it is an object thereof to provide a wiring unit that can reduce the number of oil bubbles.

According to the technique disclosed in the present description, a wiring unit includes: a wire harness; and a wiring board on which the wire harness is arranged, wherein the wiring board has: a through hole that penetrates the wiring board; and a filter that is provided in the through hole, and has pores formed in its framework having a polygonal cross section.

According to the above-described configuration, even if oil falls onto the wire harness from above and oil bubbles are created, the oil bubbles are separated from the oil by the filter provided on the wiring board on which the wire harness is arranged.

Since the framework of the filter has a polygonal cross section, the oil bubbles rupture when they come into contact with ridge line portions of the framework. Accordingly, it is possible to reduce the number of oil bubbles.

The following aspects are preferable as embodiments of the technique disclosed in the present description.

Preferably, the filter may be provided above an oil path through which oil flows, and at least a region of the oil path that is located vertically below the filter may be open upward.

According to the above-described configuration, oil that has fallen from the filter reaches, due to gravity, the oil path in the vertical direction. Accordingly, the oil that has fallen into the oil path can rupture oil bubbles that are floating on the surface of oil flowing through the oil path. Thus, it is possible to further reduce the number of oil bubbles.

Preferably, the oil path is provided with a pump for causing the oil to flow, and the filter is provided on an upstream side of an oil intake port of the pump in the oil path.

According to the above-described configuration, the number of oil bubbles is reduced by oil that falls from the filter provided on the upstream side of the oil intake port of the pump. Accordingly, oil with the reduced number of oil bubbles flows into the oil intake port of the pump, and thus it is possible to easily control the oil pressure applied by the pump.

According to the technique disclosed in the present description, it is possible to reduce the number of oil bubbles.

EMBODIMENTS

Embodiment 1

Embodiment 1 in which the technique disclosed in the present description is applied to a wiring unit 10 will be described with reference to FIGS. 1 to 7. The wiring unit 10 according to the present embodiment is arranged in an automatic transmission 11 that is installed in a vehicle (not shown). In the following, a description will be given assuming that the Z direction refers to an "up" direction, the Y direction refers to a "front" direction, and the X direction refers to a "right" direction. Furthermore, there may be cases where reference signs are given to some of a plurality of the same members and are not given to the remaining members.

Figure 1:
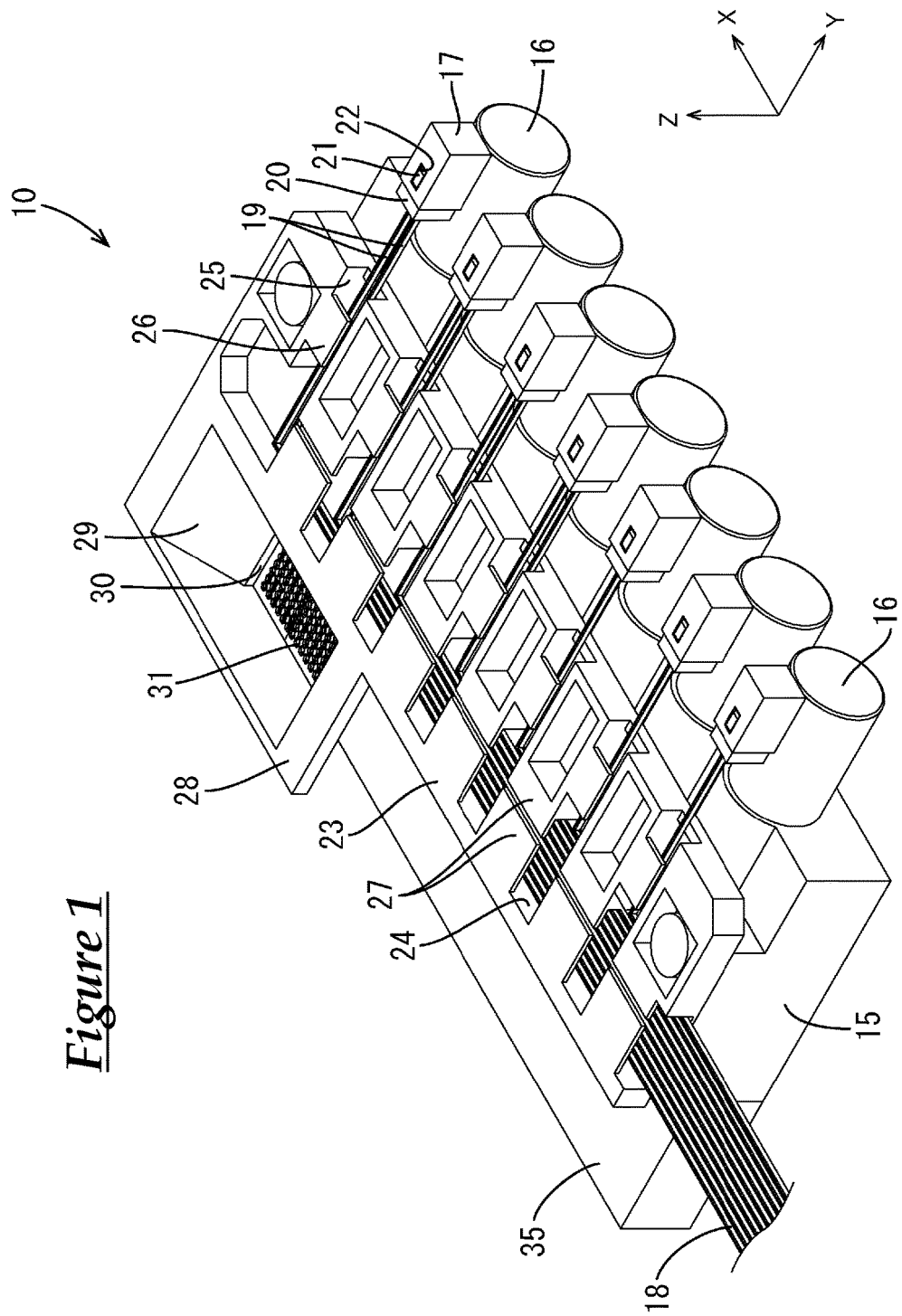
FIG. 1 is a perspective view illustrating a wiring unit according to Embodiment 1.
Figure 2:
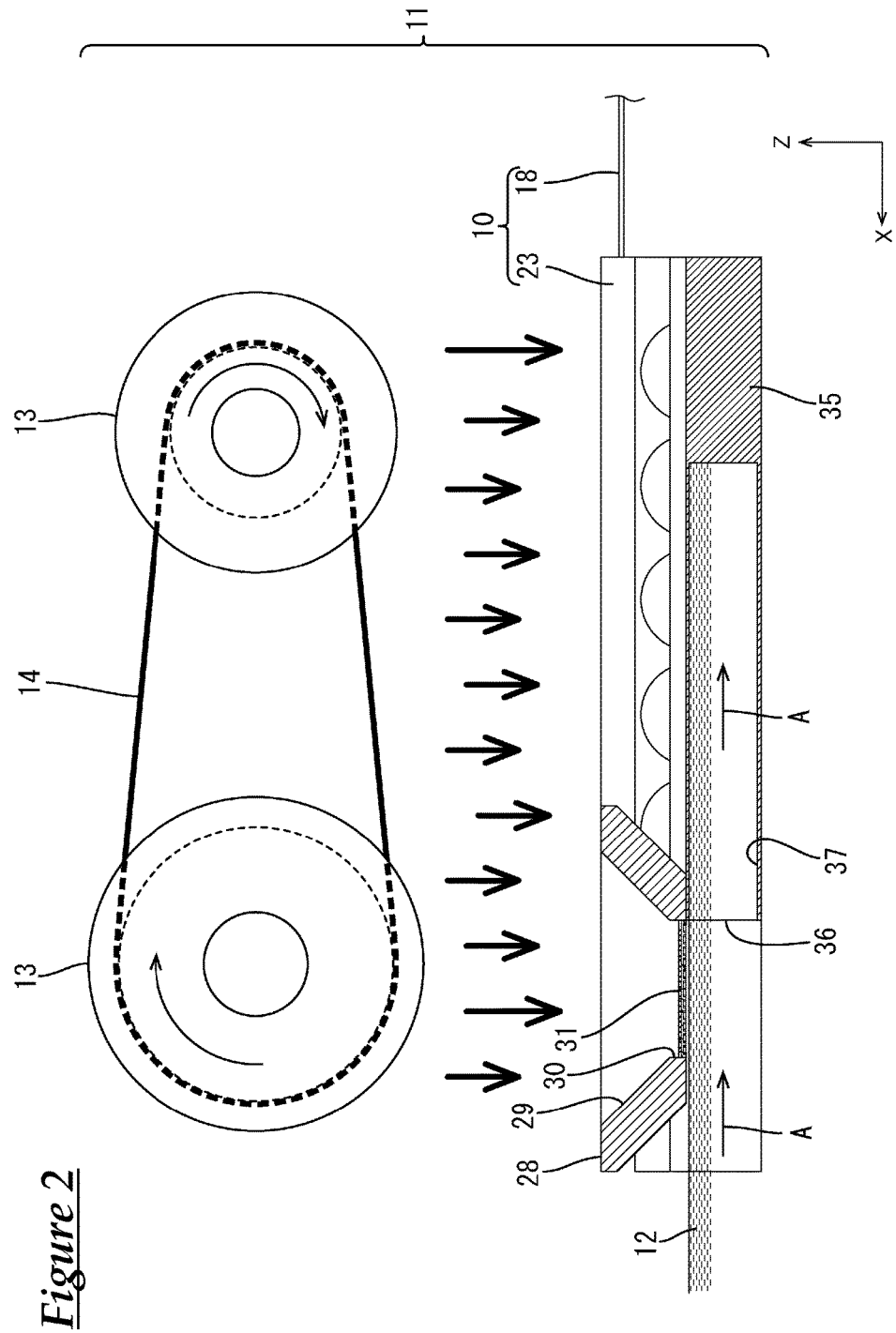
FIG. 2 is a schematic view illustrating a state in which the wiring unit shown in a cross-sectional view taken along a line II-II in FIG. 4 is arranged in an automatic transmission.
Figure 3:
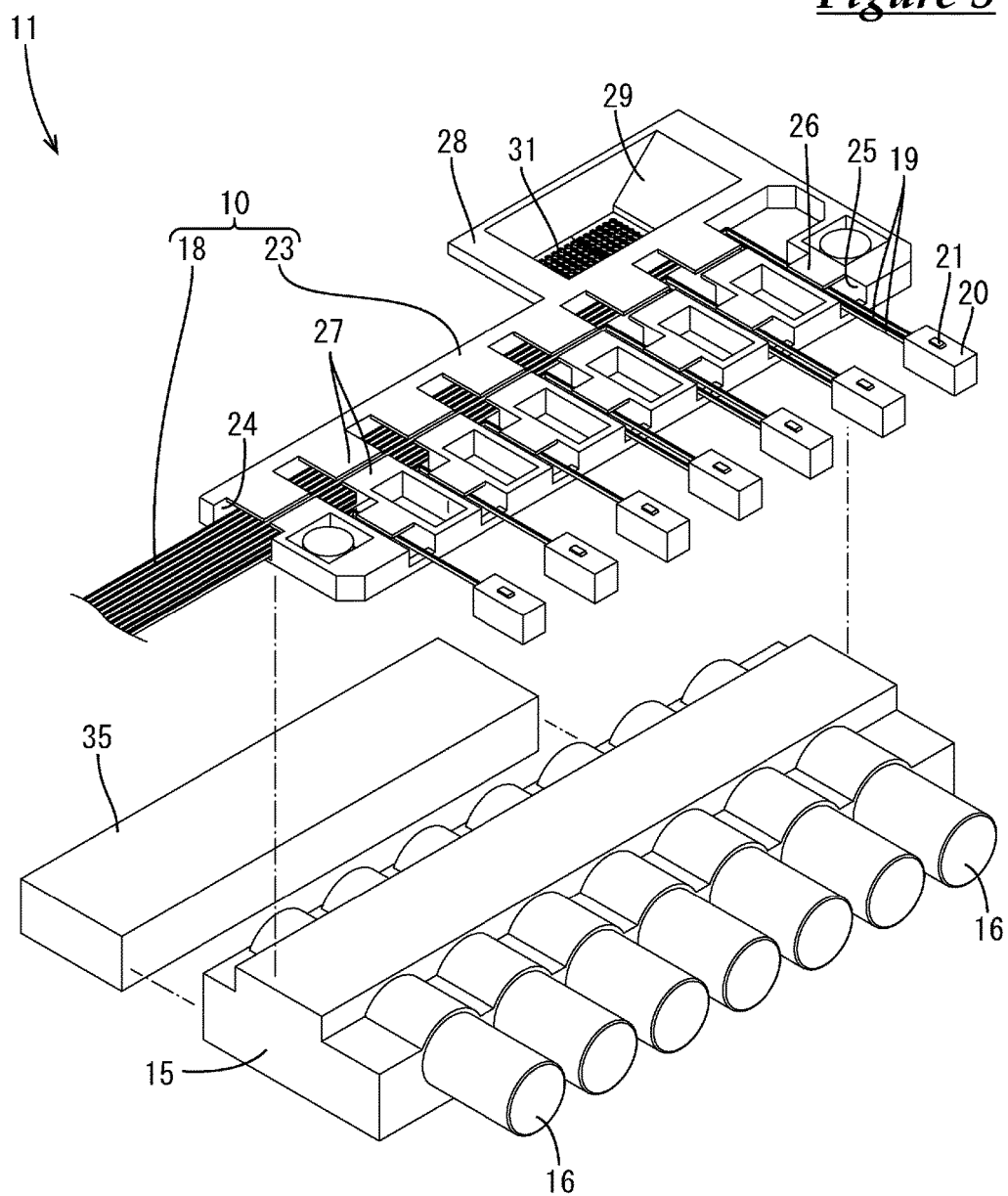
FIG. 3 is an exploded perspective view illustrating the wiring unit, a pump, and a valve body.
Figure 4:
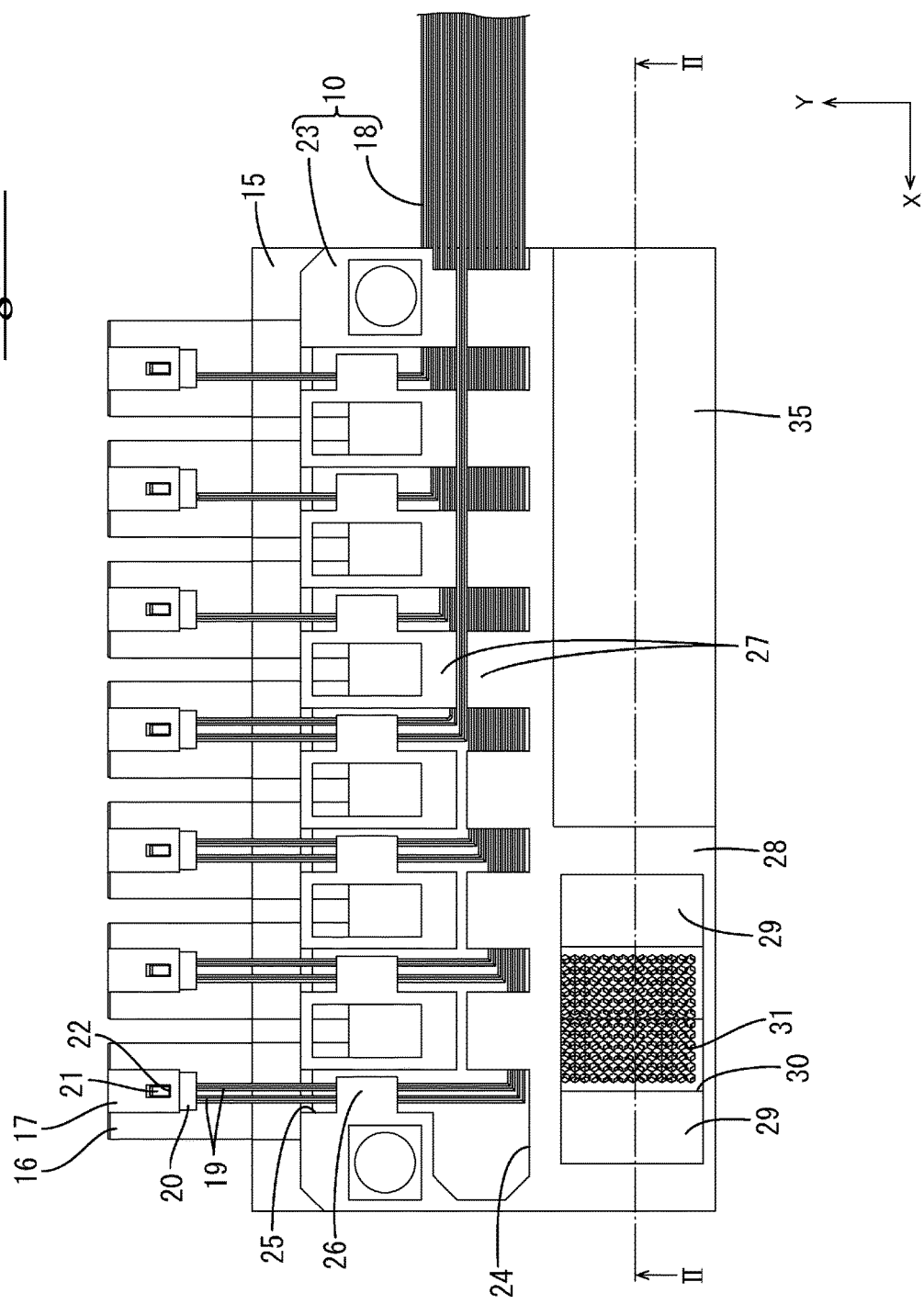
FIG. 4 is a plan view illustrating the wiring unit.
Figure 5:
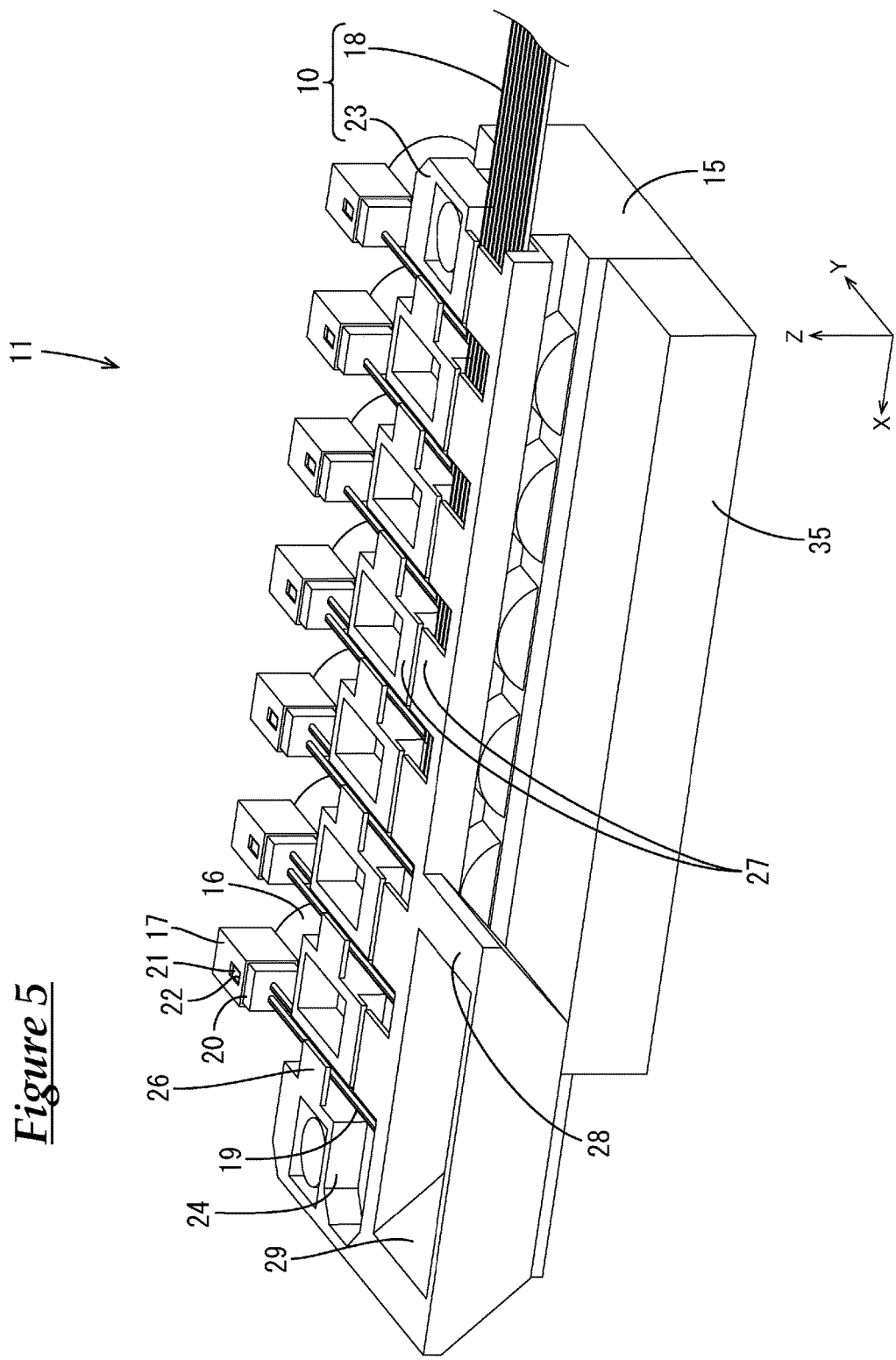
FIG. 5 is a perspective view illustrating the wiring unit.

As shown in FIG. 2, the wiring unit 10 is arranged at a position at which oil 12 circulating inside the automatic transmission 11 falls onto the wiring unit 10 from above. As shown in FIG. 2, in the present embodiment, the wiring unit 10 is disposed at a position below a pair of pulleys 13 and a belt 14 that spans the pair of pulleys 13, the pulleys 13 and the belt 14 constituting the automatic transmission 11.

A valve body 15 constituting the automatic transmission 11 is provided with a plurality of (seven, in the present embodiment) solenoid valves 16 lined up in a left-right direction. The solenoid valves 16 are substantially circularly tubular. Equipment-side connectors 17 are arranged on the respective solenoid valves 16.

The wiring unit 10 is provided with a wire harness 18. The wire harness 18 includes a plurality of electric wires 19. The electric wires 19 each have an end portion to which a wire-side connector 20 is connected. The wire-side connector 20 is connected to the corresponding equipment-side connector 17 while being retained due to a locking part 21 provided on the wire-side connector 20 engaging with a locked part 22 provided on the equipment-side connector 17.

A wiring board 23 is fixed to the upper portion of the valve body 15 with a well-known method such as screwing, using a locking structure, or gluing. The wire harness 18 is arranged on the wiring board 23. For the wiring board 23, any material such as a synthetic resin or metal may be suitably selected as appropriate. The wiring board 23 according to the present embodiment is made of an insulating synthetic resin.

The wiring board 23 is substantially plate-shaped. The wiring board 23 has, on its upper surface, a main routing groove 24, which is open upward and extends in the left-right direction. The right end of the main routing groove 24 is closed, and the left end thereof is open leftward.

The wiring board 23 has a plurality of (seven, in the present embodiment) sub routing grooves 25, which are lined up in the left-right direction and extend to the front. The sub routing grooves 25 are branched from the main routing groove 24. The sub routing grooves 25 are open upward. The rear ends of the sub routing grooves 25 are contiguous to the main routing groove 24, and the front ends of the sub routing grooves 25 are open frontward.

Each electric wire 19 drawn to the rear from the rear end of the corresponding wire-side connector 20 is routed in the sub routing groove 25, and then routed in the main routing groove 24, where it merges with an electric wire 19 connected to another wire-side connector 20. The plurality of electric wires 19 are drawn to the left from the left ends of the main routing groove 24.

Each sub routing groove 25 includes, at the upper end of its right side wall, a wire confining part 26 protruding to the left. A gap is provided between the left end of the wire confining part 26 and the left side wall of the sub routing groove 25, so that the electric wire 19 can be inserted into the sub routing groove 25 from the gap. With the wire confining parts 26, the electric wires 19 arranged in the sub routing grooves 25 can be kept from coming out from the sub routing grooves 25.

The main routing groove 24 has, at the upper ends of its rear and front walls, pairs of wire confining parts 27 that protrude to the inner side of the main routing groove 24. With the wire confining parts 27, the electric wires 19 arranged in the main routing groove 24 are kept from coming out from the main routing groove 24. The wire confining parts 27 provided on the rear wall of the main routing groove 24 protrude to the front, while the wire confining parts 27 provided on the front wall of the main routing groove 24 protrude to the rear. Gaps are provided between the respective pairs of wire confining parts 27, so that the electric wires 19 can be inserted into the main routing groove 24 from the gaps.

The wiring board 23 includes, at a position close to its right end, an oil collecting part 28 that protrudes to the rear. The oil collecting part 28 has the shape of a rectangle extending in the left-right direction when viewed from above. The oil collecting part 28 has inclined guide surfaces 29 that are inclined downward and inward from positions slightly inward of the outer edge of the oil collecting part 28. The oil collecting part 28 has a through hole 30 that penetrates the oil collecting part 28 at a position lower than the lower ends of the inclined guide surfaces 29.

A filter 31 is provided inside the through hole 30. The filter 31 is sheet-shaped or plate-shaped. The filter 31 has a plurality of communication pores that bring the upper side of the filter 31 into communication with the lower side, and thus oil bubbles contained in the oil 12 are separated by the filter 31 when the oil 12 flows downward through the filter 31 from above.

Figure 6:
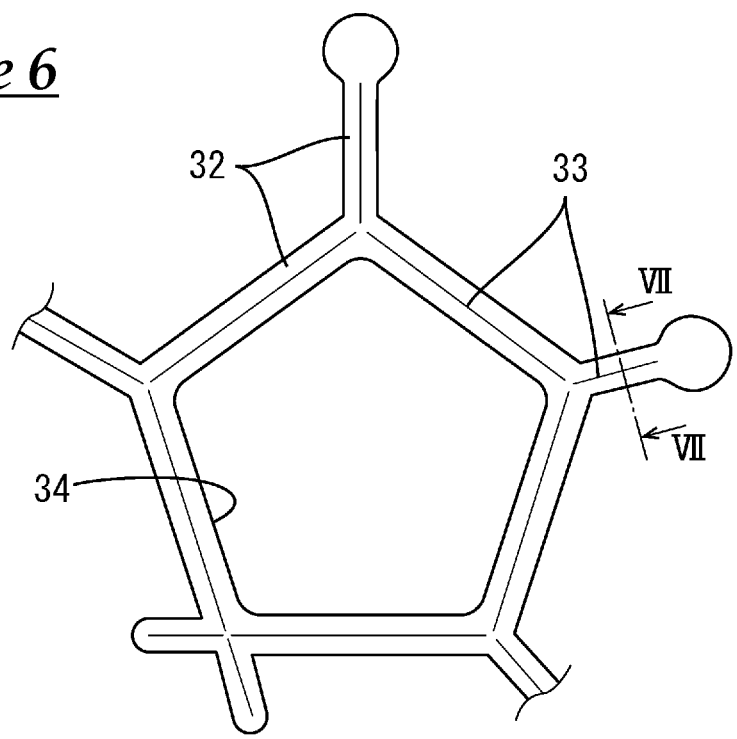
FIG. 6 is an enlarged view illustrating a framework structure of a filter.

As shown in FIG. 6, the filter 31 has pores 34 in its framework 32 made of a synthetic resin or metal. If the filter 31 is made of a synthetic resin, any synthetic resin, for example, polyolefin such as polyethylene or polypropylene, polyester such as polybutylene terephthalate, or polyamide such as 6,6-nylon may be suitably selected as appropriate. Furthermore, if the filter 31 is made metal, any material such as stainless steel, nickel, chromium, a nickel-chromium alloy may be suitably selected as appropriate. For example, Celmet (registered trademark, made of Sumitomo Electric Industries, Ltd.) may suitably be used for the filter 31.

Figure 7:
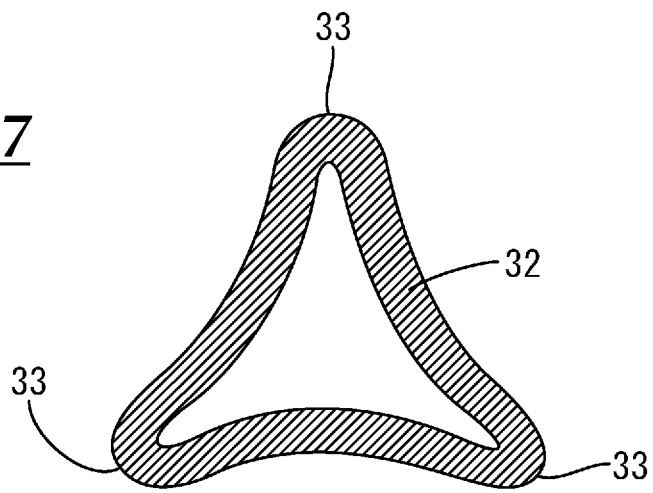
FIG. 7 is a cross-sectional view taken along a line VII-VII in FIG. 6.

As shown in FIG. 7, the filter 31 has the framework 32 having a polygonal cross section. Accordingly, oil bubbles contained in the oil 12 can be filtered out by the filter 31 and can be ruptured by coming into contact with ridge line portions 33 of the framework 32 of the filter 31.

The filter 31 may be attached to the wiring board 23 with a well-known method such as gluing or screwing. Alternatively, insert molding may be performed to make the filter 31 and the wiring board 23 into one unit.

The automatic transmission 11 is provided with a pump 35 for causing the oil 12 to flow through the automatic transmission 11. The pump 35 has an oil intake port 36 into which the oil 12 flowing through the automatic transmission 11 is sucked. The oil intake port 36 of the pump 35 is arranged at a position that is located below the lower open end of the through hole 30 formed in the oil collecting part 28 and is shifted to the left thereof. The oil intake port 36 of the pump 35 is open rightward. The pump 35 and the oil intake port 36 are contiguous to each other and form a substantially rectangular parallelepiped. The pump 35 sucks the oil 12 into the oil intake port 36 and discharges the sucked oil 12 from a not-shown discharge port, so as to cause the oil 12 to flow through the automatic transmission 11. The pump 35 is fixed to the valve body 15 with a well-known method such as screwing.

As shown in FIG. 2, due to the oil 12 being sucked into the oil intake port 36, an oil path 37 is formed in which the oil 12 flows from the upstream side of the oil intake port 36 to the downstream side in a direction indicated by an arrow A. The oil path 37 is open upward on the upstream side of the oil intake port 36. In other words, at least the region of the oil path 37 that is located vertically below the filter 31 is open upward.

Example of Assembling Procedure

Hereinafter, an example of a procedure for assembling the wiring unit 10 according to the present embodiment will be described. The procedure for assembling the wiring unit 10 is not limited to the following description.

Terminal fittings (not shown) are connected to end portions of the plurality of electric wires 19, and the terminal fittings are accommodated in the cavities (not shown) in the wire-side connectors 20.

An insulating synthetic resin material is subjected to injection molding to form the wiring board 23. The plurality of electric wires 19 are routed by being accommodated in the main routing groove 24 and the sub routing grooves 25 of the wiring board 23. The electric wires 19 to which the wire-side connectors 20 are connected are drawn from the front ends of the sub routing grooves 25 of the wiring board. Then, the plurality of electric wires 19 are drawn from the left end of the main routing groove 24 of the wiring board.

The pump 35 is fixed to the valve body 15. Then, the wiring board 23 is fixed to the upper portion of the valve body 15. Subsequently, the wire-side connectors 20 are connected to the equipment-side connectors 17 from the rear. The procedure for assembling the wiring unit 10 is thus complete.

Functions and Effects of the Present Embodiment

Hereinafter, functions and effects of the present embodiment will be described. The oil 12 flowing through the automatic transmission 11 falls downward from the pulleys 13 and the belt 14. As described above, the wiring unit 10 is arranged below the pulleys 13 and the belt 14. The oil 12 falls from the pulleys 13 and the belt 14 onto not only the wiring board 23 of the wiring unit 10 but also the wire harness 18 exposed upward from the wiring board 23. The oil 12 that has fallen onto the wiring board 23 and the wire harness 18 splashes and scatters into fine droplets. When the droplets combine into oil drops or when the oil drops also combine, air is incorporated to create oil bubbles.

The oil 12 in which oil bubbles are created flows on the wiring board 23 to the oil collecting part 28 and flows downward on the inclined guide surfaces 29 to the through hole 30. The oil 12 flows downward in the through hole 30, and reaches the filter 31 provided in the through hole 30.

The oil bubbles in the oil 12 that has reached the filter 31 are separated from the oil 12 by the pores 34 of the filter 31. Then, the oil bubbles rupture when they come into contact with the ridge line portions 33 of the framework 32 of the filter 31. Accordingly, the number of oil bubbles separated by the filter 31 is reduced by the filter 31.

The oil 12 from which the oil bubbles are separated falls from the filter 31. At this time, the oil 12 runs through the pores 34 of the filter 31 and thus falls from the lower portion of the filter 31 in a large number of fine oil drops, namely, in a shower of oil drops. Due to collision with the oil drops, oil bubbles that are floating on the oil 12 flowing below the through hole 30 can be ruptured. Accordingly, the number of oil bubbles is further reduced.

Note that it is also possible to reduce, in the same manner as described above, the number of oil bubbles in oil 12 that has fallen from the pulleys 13 and the belt 14 directly into the through hole 30, or oil bubbles in oil 12 that has fallen from another member of the automatic transmission 11 into the through hole 30.

The wiring unit 10 according to the present embodiment includes: the wire harness 18; and the wiring board 23 on which the wire harness 18 is arranged, wherein the wiring board 23 has: a through hole 30 that penetrates the wiring board 23 in a vertical direction; and the filter 31 that is provided in the through hole 30, and has the pores 34 formed in its framework 32 having a polygonal cross section.

According to the above-described configuration, even if the oil 12 falls onto the wire harness 18 and the wiring board 23 from above and oil bubbles are created, the oil bubbles are separated from the oil 12 by the filter 31 provided on the wiring board 23.

Since the framework 32 of the filter 31 has a polygonal cross section, the oil bubbles rupture when they come into contact with the ridge line portions 33 of the framework 32. Accordingly, it is possible to reduce the number of oil bubbles.

Furthermore, according to the present embodiment, the filter 31 is provided above the oil path 37 through which the oil 12 flows, and at least a region of the oil path 37 that is located vertically below the filter 31 is open upward.

Accordingly, the oil 12 that has fallen from the filter 31 reaches, due to gravity, the oil path 37 in the vertical direction. Accordingly, the oil 12 that has fallen into the oil path 37 can rupture oil bubbles that are floating on the surface of oil 12 flowing through the oil path 37. Accordingly, it is possible to further reduce the number of oil bubbles.

Furthermore, according to the present embodiment, the oil path 37 is provided with the pump 35 for causing the oil 12 to flow, and the filter 31 is provided on an upstream side of the oil intake port 36 of the pump 35 in the oil path 37.

According to the above-described configuration, the number of oil bubbles is reduced by the oil 12 that falls from the filter 31 provided on the upstream side of the oil intake port 36 of the pump 35. Accordingly, the oil 12 with the reduced number of oil bubbles flows into the oil intake port 36 of the pump 35, and thus it is possible to easily control the oil pressure applied by the pump 35.

Other Embodiments

The technique disclosed in the present description is not limited to the above-described embodiment explained in the description and illustrated in the drawings, and the technical scope of the technique disclosed in the present description may encompass, for example, the following embodiments.

The present embodiment has a configuration in which the filter 31 is arranged above the oil path 37, but the technique disclosed in the present description is not limited to this, and the filter 31 may also be arranged at a position away from the oil path 37.

The present embodiment has a configuration in which seven solenoid valves 16 are lined up, but the technique disclosed in the present description is not limited to this, and the number of solenoid valves 16 may also be one, two to six, or seven or more. Alternatively, the solenoid valves 16 may not necessarily be lined up.

The wiring unit 10 according to the present embodiment is configured to be installed in the automatic transmission 11, but the technique disclosed in the present description is not limited to this and is applicable to a wiring unit 10 that is used in circumstances in which it is showered with oil 12 from above.

The present embodiment has a configuration in which the through hole 30 formed in the wiring board 23 penetrates the wiring board 23 in the vertical direction, but the technique disclosed in the present description is not limited to this, and the through hole may also penetrate the wiring board 23 in a diagonal direction.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

10: Wiring unit
18: Wire harness
23: Wiring board
30: Through hole
31: Filter
32: Framework
34: Hole
35: Pump
36: Oil intake port
37: Oil path

What is claimed is:

1. A wiring unit comprising:
a wire harness; and
a wiring board on which the wire harness is arranged,
wherein the wiring board has:
 a through hole that penetrates the wiring board; and
 a filter that is provided in the through hole, and has pores formed in its framework having a polygonal cross section.

2. The wiring unit according to claim 1,
wherein the filter is provided above an oil path through which oil flows, and
at least a region of the oil path that is located vertically below the filter is open upward.

3. The wiring unit according to claim 2,
wherein the oil path is provided with a pump for causing the oil to flow, and
the filter is provided on an upstream side of an oil intake port of the pump in the oil path.

* * * * *